Patented Feb. 10, 1925.

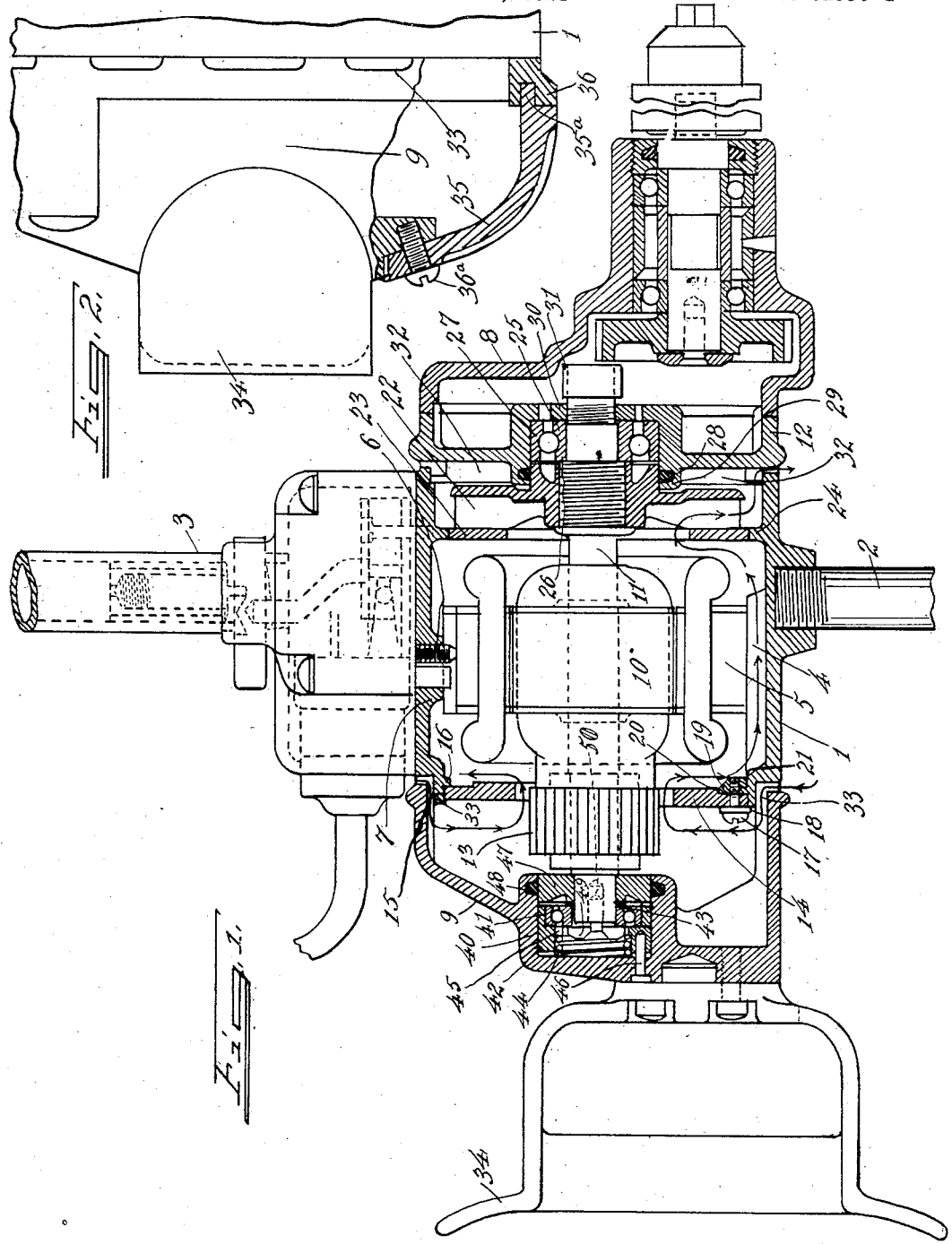

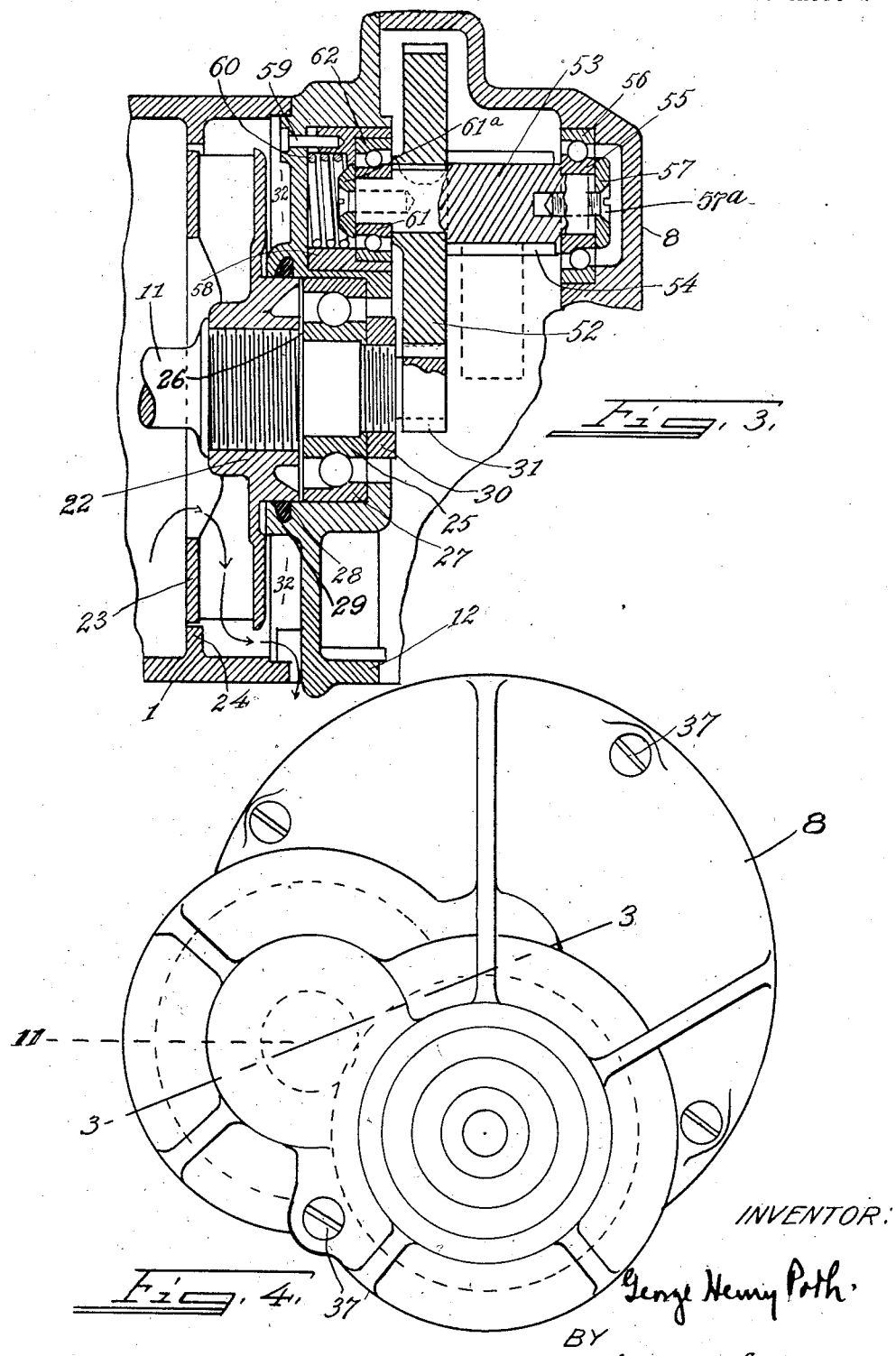

1,525,691

UNITED STATES PATENT OFFICE.

GEORGE HENRY POTH, OF CINCINNATI, OHIO, ASSIGNOR TO THE HISEY-WOLF MACHINE COMPANY, OF CINCINNATI, OHIO, A PARTNERSHIP CONSISTING OF WALTER J. FRIEDLANDER AND JOSEPH A. FRIEDLANDER.

ELECTRIC MOTOR.

Application filed October 24, 1921. Serial No. 509,900.

*To all whom it may concern:*

Be it known that I, GEORGE HENRY POTH, formerly a subject of the Emperor of Germany, who have taken out my first papers for citizenship in the United States, and a resident of Cincinnati, in the county of Hamilton and State of Ohio, have invented certain new and useful Improvements in Electric Motors, of which the following is a full, clear, and exact description, reference being had to the accompanying drawings, forming part of this specification.

My invention relates to improvements in electric motors, chiefly from the point of view of the mechanical parts thereof, and without regard to the windings, nature of brushes, stator and armature parts.

Among other objects of my invention is the provision of bearings for the shafts of electric motors which have outer raceways that are free to slide but not rotate, and which can thus be kept under spring tension. By this means I obtain, in connection with a motor case and drill case, a true bearing for the shafts in a motor without having to rely on accurate machining, and a bearing which has its own take-up for endwise play, and for expansion and contraction of shaft, and the like.

Another object of my invention is to provide for easy assembly of parts and a fan which does not interfere with the wired parts of the motor.

Furthermore, in connection with the casing and assembly of parts I provide for air passages which bring cold air over the commutator and thence through the motor and maintain an air pressure behind the fan, which holds flowing oil in the gear box and shaft bearings.

It will be noted that my invention is shown as applied to a motor for portable electric tools, but it will be understood that various features of my invention are applicable to electric motors in general and more particularly to small electric motors of the type used in electric tools.

I accomplish the objects above set forth and other advantages to be noted by that certain construction and arrangement of parts to be hereinafter more specifically pointed out and claimed.

In the drawings,

Figure 1 is a central vertical section taken through a motor, as used in electric tools.

Figure 2 is a detail bottom plan view of the back cap of the device partly broken away.

Figure 3 is a section on the line 3—3 of Figure 4.

Figure 4 is an end elevation of the front cap of the device.

The motor casing, of tubular form, as at 1, is shown with a handle 2 attached at the lower side, and a switch device 3, also serving as a handle, attached at the upper side. This casing has ribs 4 located about the interior thereof to form air passages between them, and the field member 5 is set into the casing, bearing on the ribs, and at the upper end held in place by a set screw 6, that passes through a boss 7, which also spaces the field member away from the inner wall of the casing.

On the ends of the casing are mounted the front cap 8 and the back cap 9, which will be described more in detail below. The rotor or armature 10 with its shaft 11 is set into the casing inside of the field, and the shaft supported in bearings in the back cap and in a gear plate 12, which in this case is inserted between the casing and the front cap.

On the shaft is the commutator 13, and the brushes (not shown) are mounted on a suitable plate 14. This plate is set against the flange 15 at the back end of the casing 1, said flange having a rib 16 against which the plate abuts. The desired number of clamping devices for this plate 14 are provided, comprising screws 17, which engage with their heads the washers 18, said washers lapping the end of the casing flange on the outside. On the inside of the plate a special nut 19 is used which seats behind a shoulder 20 on the plate and has a lug 21 to engage over the rib 16 on the casing flange. By this construction the brush holder plate may be clamped tightly in position in the casing.

Screwed onto the armature shaft is a fan 22 which is preferably cast, and due to the means of making and mounting it, does not have to be drilled. The fan has central openings, which are quite large, and its inner rim 23 is set in close juxtaposition to a peripheral rib 24 on the inside of the casing 1, while its outer rim lies well short of the gear plate.

In the gear plate is a suitable ball-bearing, the inner race 25 of which takes the thrust of the armature shaft against a shoulder 26 thereon. The outer race 27 is pressed tightly into the gear plate to clear the fan hub, which hub wipes a felt washer 28 that lies in the boss 29 of the gear plate that houses the bearing.

The nut 30 on the end of the shaft protruding through the inner bearing raceway engages the inner raceway on its outer edge, and the shaft itself has a pinion 31 thereon, which lies within the front cap.

The gear plate is spaced away from the outer portion of the fan, except adjacent the central boss 29, so as to leave a space or chamber 32 into which the fan can force air. The front cap, as will be noted, serves as a housing for various bearings, shafts and gears, and one of the features of great advantage in my invention is that during operation of the motor the air drawn through the casing by the fan provides sufficient pressure in the chamber to prevent flowing lubricant from getting back into the wired parts. The felt on the fan hub acts to prevent such a flow when the motor is idle, but during operation great difficulty is found in motors of the character described in providing proper lubrication for the gears without subjecting the wired parts to the danger of becoming covered with lubricant. This my air arrangement effectively prevents.

Referring next to the manner of introduction of air into the interior of the rear of the casing and the passageways out from the front, it will be noted that the back cap is made with recesses 33 formed around its edge, so that when it is screwed down on the main casing in the usual manner, the air can pass through said recesses into the interior of the cap. The cap is shown as carrying a breast plate or handle 34, this being a familiar appliance in connection with portable electric tools, such as drills and the like, and in order to adjust the brush plate a door 35 is provided having formed thereon a tongue 35ᵃ and the casing flange provided with an extra lip 36, thereby providing a socket into which the tongue may fit. This door is held down by a screw 36ᵃ.

When the air enters into the cap it is drawn through the hole left in the brush holder plate for commutator clearance and thence into the interior of the casing, cooling the commutator as it flows through the said hole. This is in contradistinction to the usual air current in a motor which passes through the casing without any deflection toward the commutator.

The ribs in the casing provide air passages and after the air has passed through the fan it flows out through recesses left in mounting the gear plate on the casing. The front cap and gear plate are held in place by screws 37, screwing into the end of the casing in the usual way.

Referring next to the bearings for the various shafts, it will be noted that one of my objects is to provide a bearing which is spring sustained, but non-rotatable as a whole.

Thus in the back cap the bearing is provided for the inner end of the armature shaft. This bearing is set into a socket 40 in the back cap and comprises an outer ring 41 held in a slidable bushing 42, and an inner ring 43 held on the shaft.

The bushing 42 is dropped into the socket with a coiled spring 44 behind it and pressing against a shoulder 45 thereon. A pin 46 thrust through from the outside of the back cap engages a hole in the bushing and prevents it from revolving and thus being subject to wear.

The shaft has a collar 47 set over its end, which fits the socket in the back cap and bears on a felt wiper 48 to prevent escape of lubricant. A cap 49, on the end of the shaft and held in place by a screw 50, engages the inner bearing race and holds it against the hub of the collar 47.

I do not believe it essential to describe all of the gears mounted on the gear plate and within the front cap of the motor or to describe the clutch or driving spindle for the drill or other tool with which the device shown may be used. I wish to note, however, that the shaft bearing arrangements can be applied to the gear case as well as to the armature shaft with equally beneficial results.

Thus the pinion 31 on the end of the armature shaft meshes with a gear 52 carried on a shaft 53. This shaft is journaled in the gear plate and the back cap and carries on it a pinion 54 by means of which motion is transmitted to the spindle gear of the machine.

The outer bearing of the shaft has a simple form of inner and outer raceways 55 and 56 with the usual balls and seats therefor, the inner race being held on the shaft by a cap 57 and screw 57ᵃ and bearing against a shoulder on the shaft. The outer race is driven into the socket of the front cap to permanently remain in place without revolution.

In the back cap is mounted the inner bearing, in which the sliding bushing 58 is provided and held against rotation by a pin 59 and resiliently forced toward the body of the shaft by a spring 60. The inner bearing race 61 is held in place by a cap 61ª on the shaft and also bears against the hub of the gear on this shaft. The outer race 62 is driven tight into the bushing and by it is pressed toward the body of the shaft.

The advantage of this form of bearing for highly revolving shafts lies both in the simplicity of manufacture in which a carefully keyed or bolted fit of a bearing race into a cast socket of a casing is avoided, and in which the entire bearing is thrust by a spring into the proper position for taking the frictional strains, compensating for any wear in the other bearing or for any slight defects in machining the shoulders on the shafts. Since the outer race carrier or bushing cannot revolve it does not wear, but keeps in true with the socket, and the inner race being clamped on the shafts is free also from frictional wear due to slipping on the same.

The bearings shown have their outer races driven tightly against revolution and their inner races clamped down tightly against rotation relative to the shafts on which they are mounted. In addition, they are open type bearings, and one of the great advantages of my sliding type bearing is that it permits the use of open type bearings on motor shafts and the like. The advantages of open type bearings are the easy assembly thereof, since to remove the shafts they need merely be pulled out axially and can be thrust in without adjustments in building up the device.

Having thus described my invention, what I claim as new and desire to secure by Letters Patent, is:—

1. In an electric motor, the combination with a casing, caps therefor, an armature shaft supported therein, one of said caps comprising a gear box into which the said shaft extends, a fan on the shaft to draw air through the casing, said fan and gear box and casing being arranged so that the air forced by the fan forms a compression pocket about the point wherein the shaft extends into the gear box in back of the fan, for the purpose described.

2. The combination with a casing for an electric motor, a gear plate thereon serving as a shaft support, a motor shaft having bearing in said support, a fan on the shaft, said fan having a hub extending into the said bearing so as to form a compression chamber about its hub, the blades of the fan being spaced away from the plate and the casing, and the casing and gear plate, at least one of them having air outlets located about the periphery of the said plate, as and for the purpose described.

3. In an electric motor, the combination with a back cap and a casing to which it is secured, said parts formed with air ducts adjacent the connection between the cap and casing, a brush holder mounted in the casing and having an adjusting member, and a door in the back cap located adjacent the brush holder adjusting member, whereby access may be had thereto, and the cap closed during operation of the motor, except for said ducts.

GEORGE HENRY POTH.